United States Patent
Zhang et al.

(10) Patent No.: US 9,544,981 B2
(45) Date of Patent: Jan. 10, 2017

(54) TOUCH DISPLAY PANEL AND TOUCH DISPLAY APPARATUS

(71) Applicant: BOE TECHNOLOGY GROUP CO., LTD., Beijing (CN)

(72) Inventors: Yuanbo Zhang, Beijing (CN); Seung Woo Han, Beijing (CN); Wei Qin, Beijing (CN); Ruoyu Ma, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 59 days.

(21) Appl. No.: 14/364,204

(22) PCT Filed: Dec. 17, 2013

(86) PCT No.: PCT/CN2013/089740
§ 371 (c)(1),
(2) Date: Jun. 10, 2014

(87) PCT Pub. No.: WO2015/043090
PCT Pub. Date: Apr. 2, 2015

(65) Prior Publication Data
US 2015/0103267 A1 Apr. 16, 2015

(30) Foreign Application Priority Data

Sep. 30, 2013 (CN) .......................... 2013 1 0461969

(51) Int. Cl.
*G09G 5/00* (2006.01)
*G06F 3/041* (2006.01)
*H05F 1/00* (2006.01)
*G02F 1/1333* (2006.01)

(52) U.S. Cl.
CPC ............. *H05F 1/00* (2013.01); *G02F 1/13338* (2013.01); *G06F 3/041* (2013.01); *G02F 2202/22* (2013.01)

(58) Field of Classification Search
CPC .......... G06F 3/041; H05F 1/00; G02F 1/1333; G02F 1/1335
(Continued)

(56) References Cited

U.S. PATENT DOCUMENTS 8,591,279 B1 * 11/2013 Cok ...................... H05K 9/0096
313/582
2007/0040816 A1 * 2/2007 Toyomaki ........... G02F 1/13338
345/174

(Continued)

FOREIGN PATENT DOCUMENTS

| CN | 102955303 A | 3/2013 |
|----|-------------|--------|
| CN | 203133441 U | 8/2013 |
| CN | 203455825 U | 2/2014 |

OTHER PUBLICATIONS

Second Office Action (Chinese language) issued by the State Intellectual Property Office ("SIPO") for Chinese Patent Application No. 201310461969.4 dated Feb. 28, 2015, 4 pgs.

(Continued)

*Primary Examiner* — Temesghen Ghebretinsae
*Assistant Examiner* — Benyam Ketema
(74) *Attorney, Agent, or Firm* — Ladas & Parry LLP

(57) ABSTRACT

The embodiments of the present disclosure disclose a touch display panel and a touch display apparatus and relate to the technical field of display, which can realize the function of preventing the static damage without affecting the touch control function. The touch display panel in the present disclosure is arranged with driving electrodes and sensing electrodes, and is further arranged with an anti-static layer which is correspondingly distributed in regions of the touch display panel other than sensing regions including overlapped regions of the driving electrodes and the sensing electrodes; and a controllable switch through which the anti-static layer is grounded.

16 Claims, 2 Drawing Sheets

(58) Field of Classification Search
USPC .................................................. 345/173–179
See application file for complete search history.

(56) References Cited

U.S. PATENT DOCUMENTS

| | | | | |
|---|---|---|---|---|
| 2008/0180584 | A1* | 7/2008 | Utsunomiya | G06F 3/044 |
| | | | | 349/12 |
| 2010/0295756 | A1* | 11/2010 | Yoshida | G02F 1/13318 |
| | | | | 345/55 |
| 2011/0227850 | A1* | 9/2011 | Oh | G02F 1/13338 |
| | | | | 345/173 |
| 2013/0044074 | A1* | 2/2013 | Park | G02F 1/13338 |
| | | | | 345/174 |
| 2013/0048960 | A1* | 2/2013 | Nishino | H01L 27/30 |
| | | | | 257/40 |

OTHER PUBLICATIONS

English translation of Second Office Action issued by SIPO for Application No. 201310461969.4 dated Feb. 28, 2015, 5 pgs.
First Office Action issued by the Chinese Patent Office for Chinese Patent Application No. 201310461969.4 dated Jul. 18, 2014, 6pgs.
English translation of First Office Action issued by the Chinese Patent Office for Chinese Patent Application No. 201310461969.4 dated Jul. 18, 2014, 6pgs.
International Search Report for International Application No. PCT/CN2013/089740, 12pgs.
International Preliminary Report on Patentability issued Apr. 5, 2016; PCT/CN2013/089740.

* cited by examiner

TOUCH DISPLAY PANEL AND TOUCH DISPLAY APPARATUS

CROSS REFERENCE TO RELATED APPLICATIONS

This application is based on International Application No. PCT/CN2013/089740 filed on Dec. 17, 2013, which claims priority to Chinese National Application No. 201310461969.4 filed on Sep. 30, 2013. The entire contents of each and every foregoing application are incorporated herein by reference.

TECHNICAL FIELD OF THE DISCLOSURE

The present disclosure relates to the technical field of display, and particularly to a touch display panel and a touch display apparatus.

BACKGROUND

With a fast development of touch display screens, current mainstream products are all employed with a structure design of an Add-on touch screen. However, the conventional Add-on touch screen is very bulky and costly. With requirement for a thin display by consumers, a In-Cell liquid crystal screen has become an important development direction in the touch display field.

In-Cell refers to a method for incorporating the function of the touch panel into a pixel circuit of a liquid crystal pixel, that is, for incorporating the touch sensor function into a liquid crystal cell, which can make the screen thinner. The current In-Cell touch display screen generally employs a capacitor sensing technology. In particular, a touch driving electrode (a Tx electrode) and a sensing electrode (a Rx electrode) manufactured for achieving the touch function are arranged in the liquid crystal cell. The Tx electrode and the Rx electrode are vertical with each other, wherein the Tx electrode is controlled by a touch control chip and outputs a series of rectangular waves line by line sequentially, and the Rx electrode will be set up with a DC voltage value as a receiving terminal. When no finger is touching the liquid crystal screen and the Tx electrode is outputting a pulse, the capacitive coupling between the Rx electrode and the Tx electrode in an overlapped region of the Tx electrode and the Rx electrode as well as a region adjacent to the overlapped region will make a voltage of the Rx electrode fluctuate, and at this time, the touch control chip will consider the fluctuation as belonging to a case in which there is no touch. When a finger is touching the liquid crystal screen, a capacitor will be formed between the finger and the Tx electrode as well as between the finger and the Rx electrode. When the Tx electrode is outputting the pulse, the coupling situation between the Rx electrode and the Tx electrode will vary due to the above capacitor, so that the voltage fluctuation situation at the Rx electrode is different from that when there is no finger touching. The touch control chip determines such difference by an algorithm to achieve the purpose for detecting the touched location.

In the In-Cell touch display screen, in order to increase the sensitivity of the touch detection, the Rx electrode is generally arranged on a color filter substrate close to the liquid crystal screen, and the backside of the color filter substrate (a side away from the liquid crystal) is further arranged with a grounded transparent conductive layer (an anti-static layer) for decreasing the static effect on the display effect of the liquid crystal panel. The inventors found that the anti-static layer will prevent the touch function from being realized, and affect the sensitivity of the touch control. However, if the anti-static layer is removed, the capability of bearing the static by the liquid crystal panel will be decreased to a large extent.

SUMMARY

A touch display panel and a touch display apparatus are provided in embodiments of the present disclosure, which are capable of realizing a function of preventing a static damage without affecting a touch control function.

A touch display panel arranged with driving electrodes and sensing electrodes is provided in the embodiments of the present disclosure, the touch display panel is further arranged with: an anti-static layer, which is correspondingly distributed in regions of the touch display panel other than sensing regions including overlapped regions of the driving electrodes and the sensing electrodes; and a controllable switch through which the anti-static layer is grounded.

Optionally, the controllable switch is closed to make the anti-static layer grounded when the touch display panel is in a display state; and the controllable switch is open to make the anti-static layer in a suspended state when the touch display panel is in a touch sensitive state.

Optionally, the controllable switch includes: two terminals, one of which is connected to the anti-static layer and the other one of which is grounded; and one control terminal for inputting a first control signal.

Optionally, the anti-static layer is a transparent conductive layer.

Optionally, the anti-static layer includes multiple conductive patterns, pattern wires and peripheral leads at edges of the touch display panel; each of the conductive patterns is not overlapped with the sensing regions, the conductive patterns are all connected through the pattern wires to the peripheral leads which are connected to the controllable switch.

Optionally, the peripheral leads are connected to the controllable switch through a flexible printed circuit board or conductive wires.

Further, the touch display panel includes a color filter substrate, an array substrate and a liquid crystal layer sandwiched therebetween; and the anti-static layer is arranged on the color filter substrate.

Optionally, the anti-static layer is arranged at a side of the color filter substrate which is away from the liquid crystal layer.

Optionally, the sensing electrode is arranged on the color filter substrate and the driving electrode is arranged on the array substrate.

In another aspect, a touch display apparatus is further provided in the present embodiment, including the touch display panel of any one as described above.

There are overlapped regions of the driving electrodes and the sensing electrodes in the touch display panel. The anti-static layer is arranged in the gap of the overlapped regions and is grounded through the controllable switch in the embodiments of the present disclosure. When the touch display panel is charged for display, the anti-static layer is grounded through the controllable switch, and at this time the anti-static layer may function to be anti-static. When the touch detection is performed by the touch display panel, the anti-static layer is controlled to be changed into the suspended state through the controllable switch. At this time, the anti-static layer won't prevent the finger capacitance from being detected, and won't interfere with the touch function. Therefore, the touch display panel and the touch display apparatus provided in the embodiments of the present disclosure can prevent the static damage without affecting the realization of the touch control function.

BRIEF DESCRIPTION OF THE DRAWINGS

In order to illustrate the technical solutions in the embodiments of the present disclosure more clearly, in the following, a brief introduction will be given to the accompanying drawings required for describing the embodiments of the present disclosure. Obviously, the accompanying drawings described as below are only for illustrating some of the embodiments of the present disclosure, and those skilled in the art can obtain other accompanying drawings from the drawings described without paying any inventive labor.

DETAILED DESCRIPTION

Hereinafter, the technical solutions in the embodiments of the present disclosure will be described clearly and thoroughly with reference to the accompanying drawings of the embodiments of the present disclosure. Obviously, the embodiments as described are only a part, but not all, of the embodiments of the present disclosure. All other embodiments obtained by those of ordinary skill in the art based on the embodiments in the present disclosure without paying any inventive labor shall fall within the protection scope of the present disclosure.

First Embodiment

Figure 1:
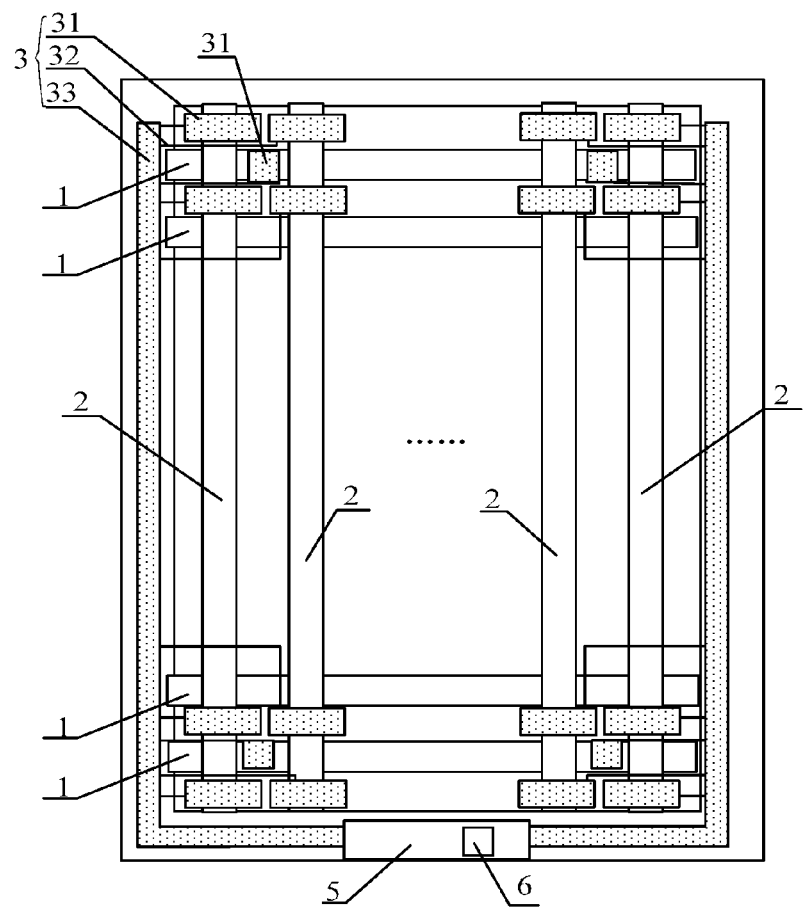
FIG. 1 is a top view schematically showing a structure of a touch display panel provided in an embodiment of the present disclosure.
Figure 2:
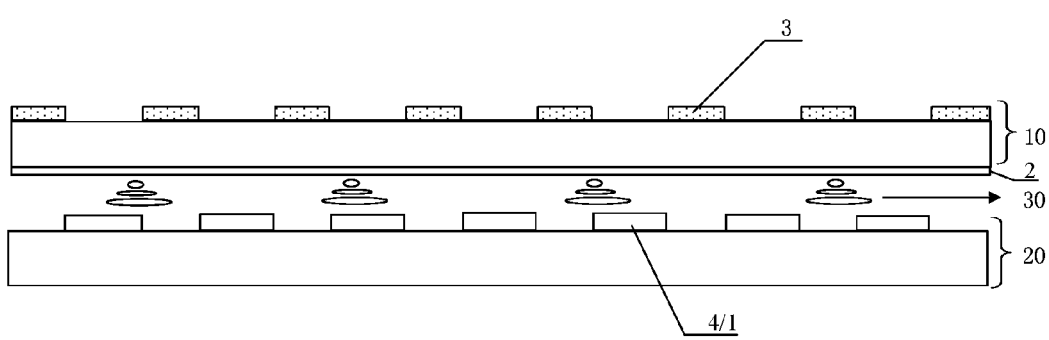
FIG. 2 is a sectional view schematically showing the structure of the touch display panel provided in the embodiment of the present disclosure.

Referring to FIGS. 1 and 2, a touch display panel is provided in the embodiment of the present disclosure, which is arranged with driving electrodes 1 and sensing electrodes 2. The touch display panel is further arranged with: a patterned anti-static layer 3, which is correspondingly distributed in a region of the touch display panel other than a sensing region 4 including an overlapped region of the driving electrode 1 and the sensing electrode 2; and a controllable switch (not shown in the figure) through which the anti-static layer 3 is grounded.

In the prior art, the anti-static layer is a transparent conductive thin film covering the whole touch display panel and is grounded; while in the present embodiment, the anti-static layer is only distributed outside of the sensing regions. The sensing regions means regions in the touch display panel where the touch sensors are located, and includes, but not limit to, overlapped regions of the driving electrodes 1 and the sensing electrodes 2, which are related to the shapes of the driving electrodes 1 and the sensing electrodes 2 and distributed regions of a touch sensing field formed between the driving electrodes 1 and the sensing electrodes 2 particularly. In short, the anti-static layer in the present embodiment is a patterned transparent conductive film (an ITO pattern), which is formed by a deposition and photolithography process when being manufactured in particular, such that the transparent conductive material is reserved in the regions other than the overlapped regions of the driving electrodes 1 and the sensing electrodes 2.

It is to be noted that FIG. 1 only shows one of the anti-static layer patterns in the present embodiment. The particular patterns of the driving electrodes 1 and the sensing electrodes 2 are not limited in the present embodiment, and the particular patterning of the anti-static layer 3 is not limited either as long as the anti-static layer 3 is not overlapped with the sensing regions so as to decrease the shielding function of the anti-static layer 3 to the driving electrodes 1 and the sensing electrodes 2.

In the embodiment of the present disclosure, the anti-static layer is grounded through the controllable switch. When the touch display panel is charged for display, the anti-static layer is grounded through the controllable switch, and at this time the anti-static layer may function to be anti-static. When the touch detection is performed by the touch display panel, the anti-static layer is controlled to be changed into the suspended state through the controllable switch in which the anti-static layer is disconnected with the ground (or the grounded signal line), and at this time the anti-static layer won't prevent the finger capacitance from being detected and won't interfere with the touch function. Therefore, the touch display panel and the touch display apparatus provided in the embodiment of the present disclosure can prevent the static damage and won't affect the realization of the touch function. The suspended state means a state in which the anti-static layer has no relationship with the outside world in terms of charge, and is in an open state with any power supply or conductor.

In order for those skilled in the art to better understand the structure of the touch display panel provided in the embodiment of the present disclosure, in the following, the touch display panel provided in the present disclosure will be described in detail by way of embodiment.

As shown in FIG. 2, the touch display panel includes a color filter substrate 10, an array substrate 20, a liquid crystal layer 30 sandwiched therebetween, and a patterned anti-static layer 3 arranged on the color filter substrate 10. In particular, the anti-static layer 3 is arranged at a side of the color filter substrate 10 which is away from the liquid crystal layer 30. The anti-static layer 3 is located at the back side (the side towards viewer) of the color filter substrate 10. The anti-static layer 3 is distributed correspondingly in the regions of the touch display panel other than the sensing regions 4 and is grounded through a controllable switch (not shown in the figure). The touch display panel is also arranged with the driving electrodes 1 being arranged on the array substrate 20, and the sensing electrodes 2 being arranged on the color filter substrate 10. For example, in order to increase the sensitivity of the touch detection, the driving electrodes 1 may be arranged at a side close to the liquid crystal layer on the array substrate 20.

As shown in FIG. 1, the anti-static layer in the present embodiment includes a plurality of conductive patterns 31, pattern wires 32 and peripheral leads 33 at edges of the touch display panel. Each of the conductive patterns 31 is not overlapped with the sensing regions. The conductive patterns 31 may be of a rectangular or other shape. The pattern wire 32 may be a very thin ITO wire. The conductive patterns 31 are all connected through the pattern wires 32 to the peripheral leads 33 which are connected to the controllable switch 6.

By connecting the anti-static layer to the peripheral leads through relatively thin ITO wirings or metal wirings, the controllable switch may be used to control the grounding and suspension of the anti-static layer. The width of the ITO wiring or the metal wiring should be wide to an extent that ensures the normal display and the touch function not being affected due to the coupling capacitance generated due to its existence, and is generally below a level of several micrometers.

Therefore, further optionally, the peripheral leads 33 are connected to the controllable switch 6 through a flexible printed circuit board 5. Of course, the peripheral leads 33 may also be connected to the controllable switch, through conductive wires which may be formed by the same transparent conductive film, together with the anti-static layer at the same time.

Generally, in the current In-Cell touch display panel, the display function and the touch sensitive function cannot be performed synchronized with each other since the touch detection function and the display function will share the common electrode. The touch detection function and the display function are realized temporally in an alternate manner. If the touch detection and the display are performed at the same time, the voltage at the common electrode will vary due to the variation of the touch voltage, thereby affecting the normal display of the picture. With respect to the In-Cell touch display panel employing a time division driving method, the following solutions are proposed in the embodiment of the present disclosure.

In the In-Cell touch display panel employing the time division driving method, the anti-static layer thereof is grounded through the controllable switch. When the touch display panel is in the display state, the controllable switch makes the anti-static layer 3 grounded, and the anti-static layer 3 may function to be anti-static. When the touch display panel is in the touch sensitive state, the controllable switch is open to disconnect the anti-static layer with the ground (or the grounded signal line) to change it into the suspended state, and the anti-static layer won't have interference with the touch function.

Figure 3:
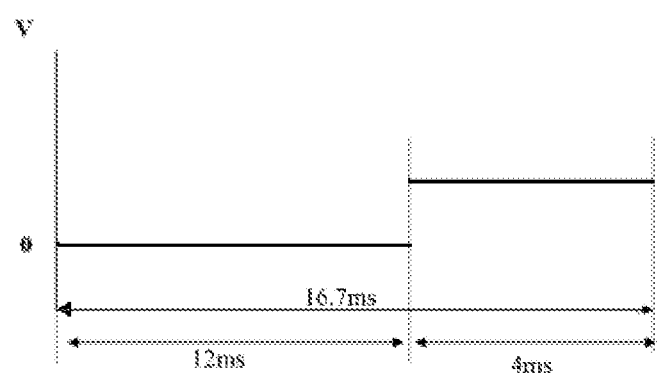
FIG. 3 is an operation timing chart of an anti-static layer in the embodiment of the present disclosure.

Taking the In-Cell touch display product of 60 HZ as an example, generally, for a product employing the time division driving method, in a frame of 16.7 ms, about 12 ms are spent on displaying and 4 ms are spent on realizing the touch function. In the time period of 12 ms in which the touch display panel is in the display state, the controllable switch is in the closed state to ground the anti-static layer 3. When the touch display panel is in the touch sensitive state, the controllable switch is open to make the anti-static layer 3 into the suspended state. FIG. 3 shows the operation timing chart of the anti-static layer 3, wherein the anti-static layer 3 is grounded in the time period of about 12 ms in the display state and the voltage thereof is zero, and is in the suspended state in the time period of about 4 ms in the touch sensitive state. In short, whether the anti-static layer is grounded or suspended is controlled by the controllable switch, ensuring that the anti-static layer is grounded when a display scan is performed and is suspended when a touch control scan is performed.

In particular, the controllable switch in the present embodiment includes two terminals, one of which is connected to the anti-static layer and the other one of which is grounded, and a control terminal for inputting a first control signal such as a frame start signal.

The controllable switch may be an internal semiconductor circuit unit of an Integrated Circuit (IC), or a TFT circuit structure controlled by an IC signal. The implementation of the controllable switch is not limited in the embodiment of the present disclosure, and may be any implementation that is well known to those skilled in the art. For example, the controllable switch may be a switch diode or other transistors having a switch function. Generally, in implementations, the controllable switch may be a Thin Film Field Effect Transistor, a Controllable Silicon Thyristor, or the like.

The touch display panel provided in the embodiments of the present disclosure can realize the anti-ESD function without affecting the touch control function.

A display apparatus is further provided in an embodiment of the present disclosure, including the touch display panel of any one as described above. The display apparatus realizes the anti-ESD function without affecting the touch control function, thereby having an excellent touch control response effect and being safer and more reliable. The display apparatus may be any product or part having the display function such as a liquid crystal panel, an electronic paper, an OLED panel, a cell phone, a tablet computer, a TV, a display, a notebook computer, a digital frame, a navigation device, or the like.

The above descriptions are only for illustrating the embodiments of the present disclosure, and in no way limit the scope of the present disclosure. The variations or alternations that may be easily thought of by those skilled in the art within the technical scope disclosed by the present disclosure shall fall within the protection scope of the present disclosure. Therefore, the protection scope of the present disclosure shall be defined by the protection scope of the appended claims.

What is claimed is:

1. A touch display panel comprising:
   a driving electrode layer arranged with driving electrodes,
   a sensing electrode layer arranged with sensing electrodes;
   an anti-static layer arranged with conductive anti-static patterns each of which does not overlap spatially overlapped regions of the driving electrodes and the sensing electrodes; and
   a controllable switch through which the anti-static layer is grounded,
   wherein the anti-static layer is different from the sensing electrode layer and the driving electrode layer, and the driving electrode layer is different from the sensing electrode layer.

2. The touch display panel of claim 1, wherein
   the controllable switch is closed to make the anti-static layer grounded when the touch display panel is in a display state; and
   the controllable switch is open to make the anti-static layer in a suspended state when the touch display panel is in a touch sensitive state.

3. The touch display panel of claim 2, wherein
   the controllable switch includes: two terminals, one of which is connected to the anti-static layer and the other one of which is grounded; and one control terminal for inputting a first control signal.

4. The touch display panel of claim 1, wherein the anti-static layer is a transparent conductive layer.

5. The touch display panel of claim 1, wherein the anti-static layer further includes pattern wires and peripheral leads at edges of the touch display panel;
   the conductive anti-static patterns are all connected through the pattern wires to the peripheral leads which are connected to the controllable switch.

6. The touch display panel of claim 5, wherein the peripheral leads are connected to the controllable switch through a flexible printed circuit board or conductive wires.

7. The touch display panel of claim 1, wherein the touch display panel further includes a color filter substrate, an array substrate and a liquid crystal layer sandwiched therebetween; and the anti-static layer is arranged on the color filter substrate, the driving electrode layer is arranged on the array substrate, and the sensing electrode layer is arranged between the color filter substrate and the liquid crystal layer.

8. The touch display panel of claim 7, wherein the anti-static layer is arranged at a side of the color filter substrate which is away from the liquid crystal layer.

9. A touch display apparatus including the touch display panel of claim 1.

10. The touch display apparatus of claim 9, wherein the controllable switch is closed to make the anti-static layer grounded when the touch display panel is in a display state; and the controllable switch is open to make the anti-static layer in a suspended state when the touch display panel is in a touch sensitive state.

11. The touch display apparatus of claim 10, wherein the controllable switch includes: two terminals, one of which is connected to the anti-static layer and the other one of which is grounded; and one control terminal for inputting a first control signal.

12. The touch display apparatus of claim 9, wherein the anti-static layer is a transparent conductive layer.

13. The touch display apparatus of claim 9, wherein the anti-static layer further includes pattern wires and peripheral leads at edges of the touch display panel;

the conductive anti-static patterns are all connected through the pattern wires to the peripheral leads which are connected to the controllable switch.

14. The touch display apparatus of claim 13, wherein the peripheral leads are connected to the controllable switch through a flexible printed circuit board or conductive wires.

15. The touch display apparatus of claim 9, wherein the touch display panel further includes a color filter substrate, an array substrate and a liquid crystal layer sandwiched therebetween; and the anti-static layer is arranged on the color filter substrate, the driving electrode layer is arranged on the array substrate, and the sensing electrode layer is arranged between the color filter substrate and the liquid crystal layer.

16. The touch display apparatus of claim 15, wherein the anti-static layer is arranged at a side of the color filter substrate which is away from the liquid crystal layer.

\* \* \* \* \*